(12) United States Patent
Roh et al.

(10) Patent No.: US 11,316,557 B2
(45) Date of Patent: Apr. 26, 2022

(54) ELECTRONIC DEVICE AND METHOD FOR IDENTIFYING PRODUCT BASED ON NEAR FIELD COMMUNICATION

(71) Applicant: Samsung Electronics Co., Ltd., Suwon-si (KR)

(72) Inventors: Yangwoon Roh, Suwon-si (KR); Hwanjin Kim, Suwon-si (KR); Yeonsik Yu, Suwon-si (KR); Cheaok Ko, Suwon-si (KR); Keonyoung Seo, Suwon-si (KR); Jihun Yu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/110,730

(22) Filed: Dec. 3, 2020

(65) Prior Publication Data

US 2021/0167815 A1 Jun. 3, 2021

(30) Foreign Application Priority Data

Dec. 3, 2019 (KR) .......................... 10-2019-0158980

(51) Int. Cl.
| | | |
|---|---|---|
| *H04W 4/00* | (2018.01) | |
| *H04W 4/02* | (2018.01) | |
| *H04B 5/00* | (2006.01) | |
| *G08B 21/22* | (2006.01) | |

(52) U.S. Cl.
CPC ........... *H04B 5/0031* (2013.01); *G08B 21/22* (2013.01); *H04B 5/0056* (2013.01)

(58) Field of Classification Search
None
See application file for complete search history.

(56) References Cited

U.S. PATENT DOCUMENTS

| | | | | |
|---|---|---|---|---|
| 7,091,959 | B1 * | 8/2006 | Clary | G06F 3/03545 |
| | | | | 345/173 |
| 9,253,589 | B2 * | 2/2016 | McCann | H04W 4/80 |
| 9,742,474 | B1 * | 8/2017 | Green | H04W 4/80 |
| 9,961,529 | B2 * | 5/2018 | England | G06Q 20/1085 |
| 10,034,260 | B2 * | 7/2018 | McCann | H04W 60/04 |
| 10,091,047 | B2 * | 10/2018 | Gilson | H04W 76/11 |
| 10,103,784 | B2 * | 10/2018 | Leica | H04W 4/80 |
| 10,177,816 | B2 * | 1/2019 | Ehrensvard | H04W 12/068 |

(Continued)

FOREIGN PATENT DOCUMENTS

| | | |
|---|---|---|
| KR | 10-0777369 B1 | 11/2007 |
| KR | 10-0777372 B1 | 11/2007 |
| KR | 10-2014-0117107 A | 10/2014 |

*Primary Examiner* — Tuan A Tran

(57) ABSTRACT

A method for identifying information on an external electronic device based on near field communication (NFC). The method includes transmitting a signal of an NFC band to the external electronic device; identifying whether the external electronic device is capable of NFC, requesting an NFC identifier (ID) from the external electronic device, and receiving the NFC ID from the external electronic device; receiving the NFC ID, reading a unique identifier from the NFC ID, and identifying a communication protocol type; identifying flag information included in the NFC ID; and determining whether the external electronic device is initially recognized and/or normally recognized through the flag information.

20 Claims, 7 Drawing Sheets

(56) References Cited

U.S. PATENT DOCUMENTS

| | | | | |
|---|---|---|---|---|
| 10,311,428 B2* | 6/2019 | Bush | ................... | G06Q 20/3278 |
| 10,565,640 B2* | 2/2020 | Poornachandran | ....... | G06F 9/54 |
| 10,949,832 B2* | 3/2021 | Bush | ...................... | H04W 4/80 |
| 11,129,123 B2* | 9/2021 | McCann | ................ | H04W 60/04 |
| 2012/0322370 A1* | 12/2012 | Lee | ......................... | H04W 4/50 |
| | | | | 455/41.1 |
| 2013/0102246 A1* | 4/2013 | Gagne | ................ | G06Q 20/3278 |
| | | | | 455/41.1 |
| 2016/0378192 A1* | 12/2016 | Zhang | ..................... | G06F 3/017 |
| | | | | 345/156 |
| 2018/0041860 A1* | 2/2018 | England | ............... | G06Q 20/352 |

* cited by examiner

ELECTRONIC DEVICE AND METHOD FOR IDENTIFYING PRODUCT BASED ON NEAR FIELD COMMUNICATION

CROSS-REFERENCE TO RELATED APPLICATION

This application is based on and claims priority under 35 U.S.C. 119 to Korean Patent Application No. 10-2019-0158980 filed on Dec. 3, 2019 in the Korean Intellectual Property Office, the disclosure of which is herein incorporated by reference in its entirety.

BACKGROUND

1. Field

Various embodiments of the disclosure relate to an electronic device and a method for identifying a product based on near field communication.

2. Description of Related Art

After a product is produced by a manufacturer, a unique identifier (ID) can be assigned to the product for distribution and management of the product. The unique ID of the product may be attached to the body of the product or the packaging of the product in the form of a printed barcode. However, when the unique ID is attached to the product in the form of a printed barcode, there is a problem that the beauty of the product is damaged or the unique ID is damaged due to carelessness in the distribution process.

The above information is presented as background information only to assist with an understanding of the disclosure. No assertion is made, as to whether any of the above might be applicable as prior art with regard to the disclosure.

SUMMARY

An electronic device and a method of identifying a product based on short-range wireless communication according to various embodiments of the disclosure may determine a unique ID of a product by using short-range wireless communication included in the product or the electronic device, and may transmit the determined unique ID to a linked database management device.

An electronic device and a method of identifying a product based on short-range wireless communication according to various embodiments of the disclosure may identify a product unique ID by utilizing near field communication (NFC) included in the product or the electronic device, and may transmit the identified product unique ID to another electronic device by using a human interface device (HID) connection.

A method of identifying information on an external electronic device based on near field communication (NFC) according to various embodiments of the disclosure may include: transmitting a signal of an NFC band to the external electronic device; identifying whether the external electronic device is capable of NFC, requesting an NFC identifier from the external electronic device, and receiving the NFC identifier from the external electronic device; receiving the NFC identifier, reading a unique identifier from the NFC identifier, and identifying a communication protocol type; identifying flag information included in the NFC identifier; and determining whether the external electronic device is initially recognized and/or normally recognized through the flag information.

An electronic device according to various embodiments of the disclosure may include: a communication module configured to include an NFC module; a memory; and a processor, wherein the processor transmits a signal of an NFC band to an external electronic device through the NFC module; identifies whether the external electronic device is capable of NFC, requests an NFC ID from the external electronic device through the NFC module, and receives the NFC ID from the external electronic device; receives the NFC identifier, reads a unique ID from the NFC ID to identify a communication protocol type; identifies flag information included in the NFC identifier; and determines whether the external electronic device is initially recognized and/or normally recognized through the flag information.

An electronic device and a method for identifying a product based on NFC according to various embodiments of the disclosure may identify a unique ID of a product using a communication device included in the product or the electronic device without attaching a printed label such as a barcode to the product or the electronic device for identifying the unique ID of the product, whereby it is possible to stably identify the unique ID of the product without fear of damage to a printed label such as a barcode for identifying the unique ID of the product which may occur during distribution of the product or the electronic device.

An electronic device and a method for identifying a product based on NFC according to various embodiments of the disclosure may identify a unique ID of a product using a communication device included in the product or the electronic device, and may transmit product information to a database by utilizing HID information, thereby identifying the unique ID of the product at a high speed.

An electronic device and a method for identifying a product based on NFC according to various embodiments of the disclosure may identify a unique ID of a product using a communication device included in the product or the electronic device without attaching a printed label with the unique ID to the product or the electronic device, whereby it is possible to reduce costs for labeling and for label maintenance.

An electronic device and a method for identifying a product based on NFC according to various embodiments of the disclosure may identify a unique ID of a product using a communication device included in the product or the electronic device, whereby a printed label such as a barcode for identifying the unique ID of the product is not separately attached to the product or the electronic device to improve the aesthetics of the product.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
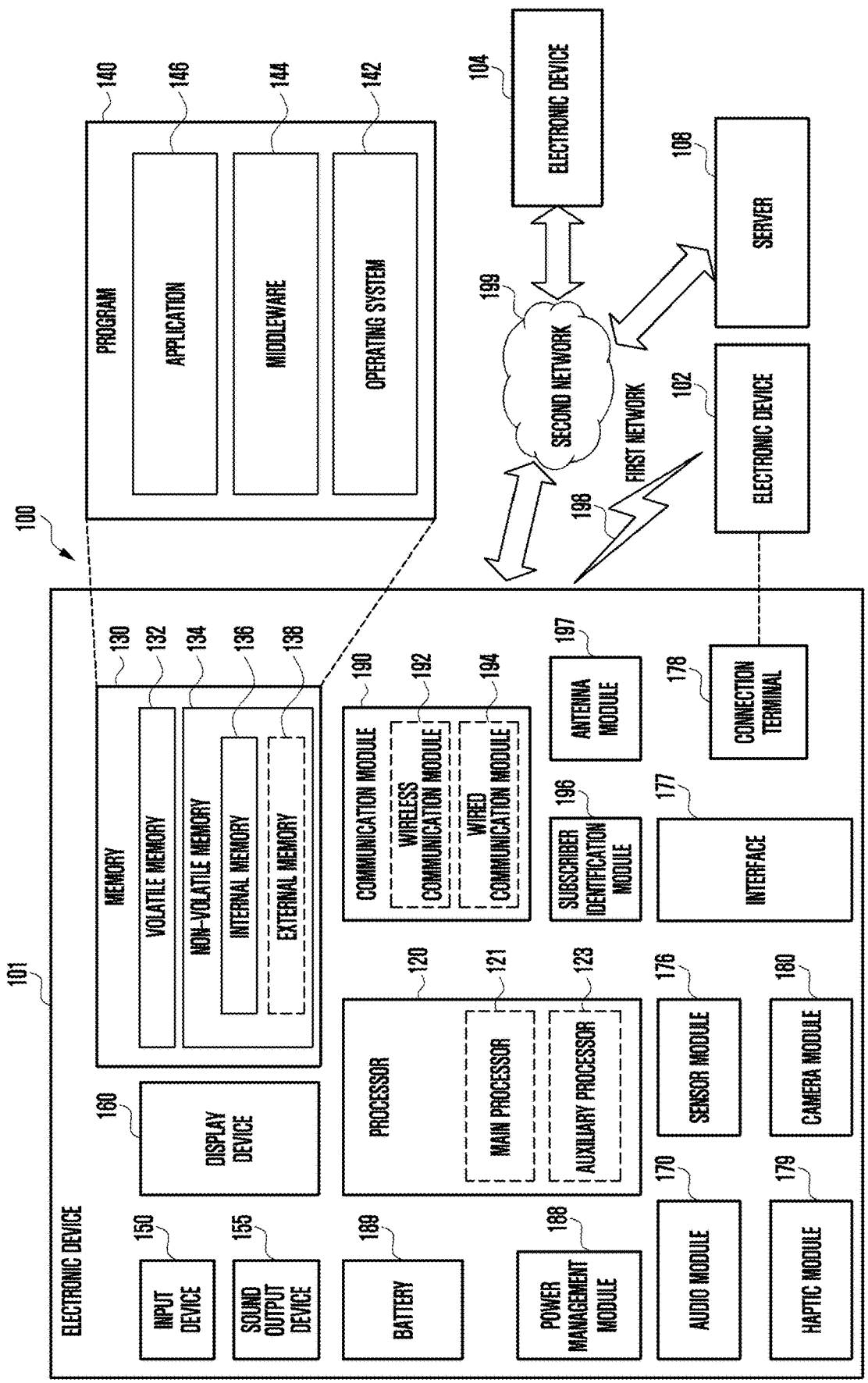
FIG. 1 illustrates a block diagram of an example electronic device in a network environment according to various embodiments.

FIG. 1 illustrates a block diagram of an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
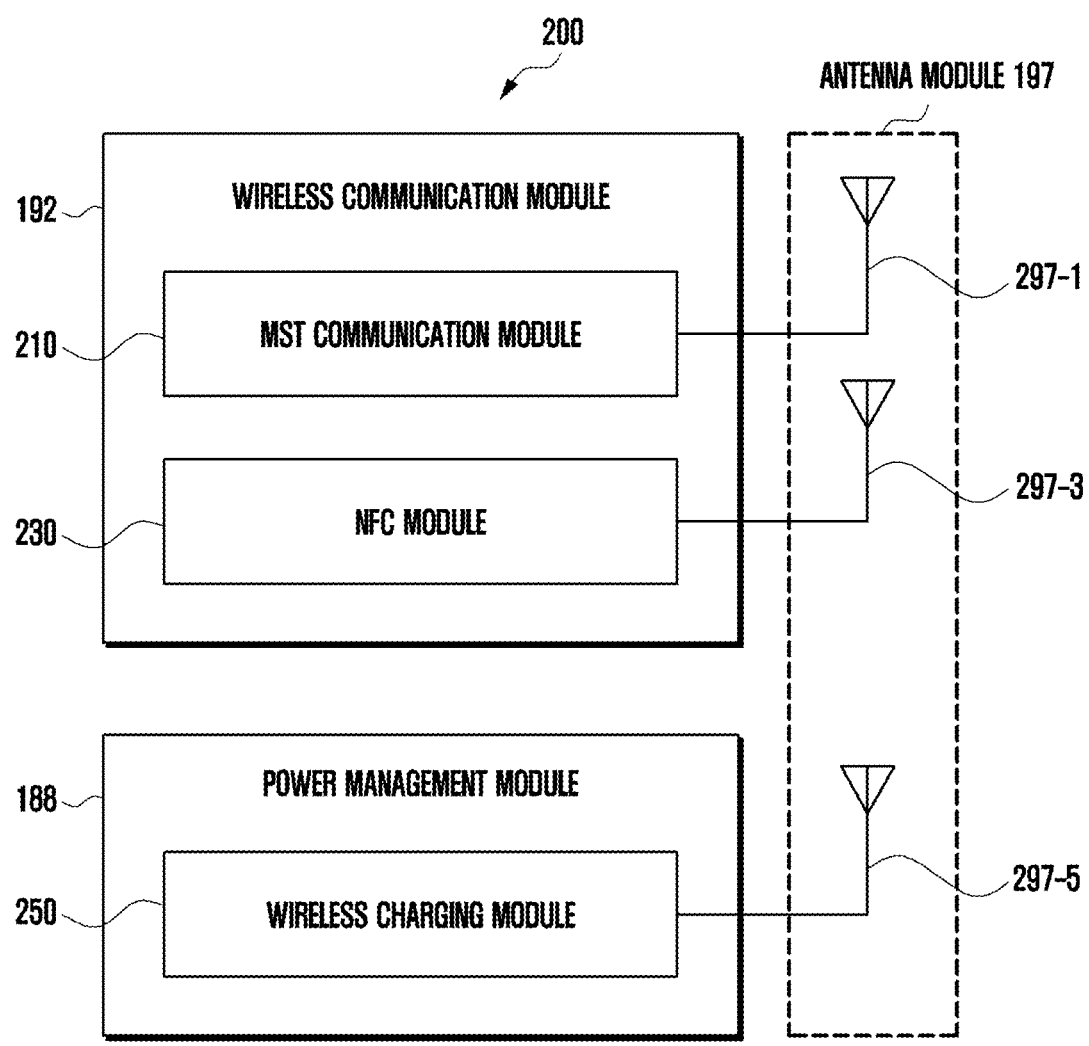
FIG. 2 illustrates a block diagram of an example wireless communication module, a power management module, and an antenna module of an electronic device according to various embodiments.

FIG. 2 illustrates a block diagram 200 an example of a wireless communication module 192, a power management module 188, and an antenna module 197 of an electronic device 101 according to various embodiments. Referring to FIG. 2, the wireless communication module 192 may include an MST communication module 210 or an NFC module 230, and the power management module 188 may include a wireless charging module 250. In this case, the antenna module 297 may include a plurality of antennas including an MST antenna 297-1 connected to the MST communication module 210, an NFC antenna 297-3 connected to the NFC module 230, and a wireless charging antenna 297-5 connected to the wireless charging module 250. For convenience of description, the components overlapping those in FIG. 1 will be omitted or briefly described.

The MST communication module 210 may receive a signal including control information or payment information such as card information from a processor 120, may generate a magnetic signal corresponding to the received signal through the MST antenna 297-1, and may then transmit the generated magnetic signal to an external electronic device 102 (e.g., a POS device). In order to generate the magnetic signal, according to an embodiment, the MST communication module 210 may include a switching module (not shown) including one or more switches connected to the MST antenna 297-1, and may change the direction of voltage or current supplied to the MST antenna 297-1 according to the received signal by controlling the switching module. The change in the direction of the voltage or current makes it possible to change the direction of a magnetic signal (e.g., a magnetic field) transmitted through the MST antenna 297-1. When the magnetic signal in a state in which the direction is changed is detected by the external electronic device 102, it may cause an effect similar to a magnetic field (e.g., waveform) that occurs while a magnetic card corresponding to the received signal (e.g., card information) is swiped by the card reader of the electronic device 102. According to an embodiment, payment-related information and control signals received in the form of the magnetic signals from the electronic device 102 may be transmitted to an external server 108 (e.g., a payment server) through, for example, a network 199.

The NFC module 230 may acquire a signal including control information or payment information such as card information from the processor 120, and may transmit the acquired signal to the external electronic device 102 through the NFC antenna 297-3. According to an embodiment, the NFC module 230 may receive a signal transmitted from the external electronic device 102 through the NFC antenna 297-3.

The wireless charging module 250 may wirelessly transmit power to the external electronic device 102 (e.g., a mobile phone or a wearable device) through the wireless charging antenna 297-5, or may wirelessly receive power from the external electronic device 102 (e.g., a wireless charging device). The wireless charging module 250 may support one or more of various wireless charging methods including, for example, a magnetic resonant method or a magnetic inductive method.

According to an embodiment, some of the MST antenna 297-1, the NFC antenna 297-3, or the wireless charging antenna 297-5 may share at least a part of a radiating unit with each other. For example, the radiating unit of the MST antenna 297-1 may be used as the radiating unit of the NFC antenna 297-3 or the wireless charging antenna 297-5, and vice versa. In this case, the antenna module 297 may include a switching circuitry (not shown) configured to selectively connect (e.g., close) or disconnect (e.g., open) at least some of the antennas 297-1, 297-3, or 297-5 under the control of the wireless communication module 192 (e.g., the MST communication module 210 or the NFC module 230) or the power management module 188 (e.g., the wireless charging module 250). For example, when the electronic device 101 uses a wireless charging function, the NFC module 230 or the wireless charging module 250 may temporarily disconnect, from the NFC antenna 297-3, at least a partial region of the radiating unit shared by the NFC antenna 297-3 and the wireless charging antenna 297-5, and may connect the same to the wireless charging antenna 297-5.

According to an embodiment, at least one function of the MST communication module 210, the NFC module 230, or the wireless charging module 250 may be controlled by an external processor (e.g., the processor 120). According to an embodiment, designated functions (e.g., payment function) of the MST communication module 210 or the NFC module 230 may be performed in a trusted execution environment (TEE). The TEE according to various embodiments may form an execution environment to which at least some designated regions of the memory 130 are allocated in order to be used to perform a function that requires, for example, a relatively high level of security (e.g., a function related to a financial transaction or personal information). In this case, access to the designated region may be restrictively allowed in a distinguishable manner according to, for example, a subject accessing the designated region or an application executed in the TEE.

Figure 3:
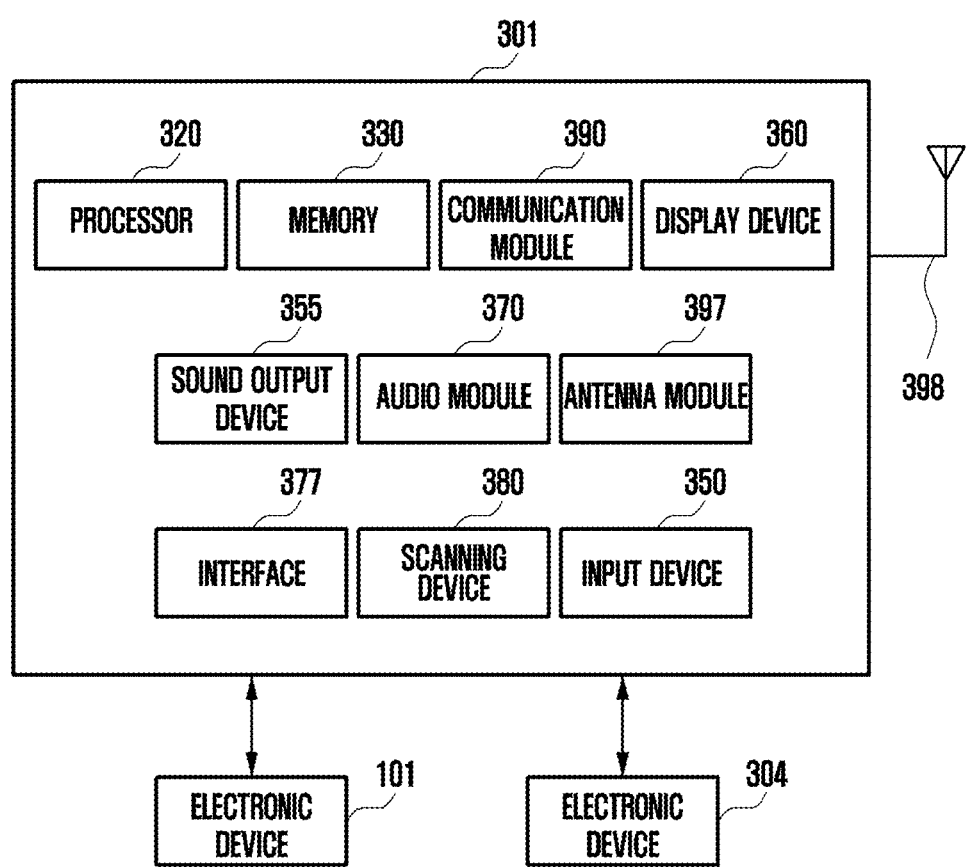
FIG. 3 illustrates a block diagram of an example electronic device according to various embodiments of the disclosure.

FIG. 3 illustrates a block diagram of an example electronic device 301 according to various embodiments of the disclosure.

The electronic device 301 may include a processor 320, a memory 330, an input device 350, a sound output device 355, a display device 360, an audio module 370, an interface 377, a scanning device 380, a communication module 390, an antenna module 397, and an antenna 398. The components of the electronic device 301 of FIG. 3 may be similar to or the same as those of the electronic device 101 of FIG. 1.

The processor 320 may control at least one other component (e.g., hardware or software component) of the electronic device 301 connected to the processor 320 by executing, for example, software and/or a program, and may perform various data processing or operations.

According to an embodiment, as at least part of data processing or operations, the processor 320 may load commands or data received from another component (e.g., the communication module 390) into a volatile memory, may process the commands or data stored in the volatile memory, and may store the resulting data in a nonvolatile memory.

The memory 330 may store various types of data used by at least one component (e.g., the processor 320 and/or the communication module 390) of the electronic device 301. The data may include, for example, input data or output data for software and/or commands related thereto. The memory 330 may include a volatile memory and/or a nonvolatile memory.

The input device 350 may receive commands or data to be used for the components (e.g., the processor 320) of the electronic device 301 from outside the electronic device 301 (e.g., a user). The input device 350 may include, for example, a microphone, a mouse, a keyboard, or a digital pen (e.g., a stylus pen).

The sound output device 355 may output an sound signal to the outside of the electronic device 301. The sound output device 355 may include, for example, a speaker or a receiver. The speaker can be used for general purposes such as multimedia playback or recording playback, and the receiver can be used to receive incoming calls. According to an embodiment, the receiver may be implemented separately from the speaker or as a part of the speaker.

The display device 360 may visually provide information to the outside of the electronic device 301 (e.g., a user). The display device 360 may include, for example, a display, a hologram device, or a projector and a control circuitry for controlling the corresponding device. According to an embodiment, the display device 360 may include a touch circuitry configured to sense a touch, or a sensor circuitry (e.g., a pressure sensor) configured to measure the strength of a force generated by the touch.

The audio module 370 may convert sound into an electrical signal or an electrical signal into sound. According to an embodiment, the audio module 370 may acquire sound through the input device 350, or may output sound through an external electronic device (e.g., a speaker or a headphone) which is directly wired, or wirelessly connected to the sound output device 355 or the electronic device 301.

The interface 377 may support one or more designated protocols that may be used for the electronic device 301 to be connected directly or wirelessly to the external electronic device (e.g., the electronic device 101 and/or the electronic device 304). According to an embodiment, the interface 377 may include, for example, a high definition multimedia interface (HDMI), a universal serial bus (USB) interface, an SD card interface, or an audio interface.

The communication module 390 may support establishment of a direct (e.g., wired) communication channel or a wireless communication channel between the electronic device 301 and the external electronic device (e.g., the electronic device 101 and/or the electronic device 304) and may support communication execution through the established communication channel. The communication module 390 may operate independently of the processor 320 (e.g., an application processor) and may include one or more communication processors that support direct (e.g., wired) communication or wireless communication.

According to an embodiment, the communication module 390 may include a wireless communication module (e.g., a cellular communication module, a near field communication (NFC) communication module and/or a GNSS communication module) or a wired communication module (e.g., a local area network (LAN) communication module and/or a power line communication module). Among these communication modules, the corresponding communication module may communicate with the external electronic device through a short-range communication network such as NFC, Bluetooth, Wi-Fi direct and/or infrared data association (IrDA), and/or a telecommunications network such as a cellular network, the Internet, or a computer network (e.g., LAN or WAN). These various types of communication modules may be integrated into a single component (e.g., a single chip), or may be implemented with a plurality of separate components (e.g., a plurality of chips).

The antenna module 397 may transmit or receive a signal or power to and from the outside (e.g., an external electronic device). According to an embodiment, the antenna module 397 may include one antenna including a radiator formed of a conductor or a conductive pattern formed on a substrate (e.g., PCB). According to an embodiment, the antenna module 397 may include a plurality of antennas 398.

The antenna module 397 may include a switching circuitry (not shown) configured to selectively connect (e.g., close) or disconnect (e.g., open) at least some of the antennas 398 under the control of the wireless communication module (e.g., the MST communication module 210 of FIG. 2 or the NFC module 230 of FIG. 2). The antenna module 397 may selectively connect (e.g., close) or disconnect (e.g., open) the at least some of the antennas 398 under the control of the wireless communication module (e.g., the MST communication module 210 in FIG. 2 or the NFC module 230 in FIG. 2) to transmit or receive signals.

The scanning device 380 may communicate with the external electronic device (e.g., the electronic device 101) using short-range wireless communication (e.g., NFC communication), and may receive information on a unique identifier of the external electronic device (e.g., the electronic device 101) from the external electronic device (e.g., the electronic device 101). The scanning device 380 may be included in the communication module 390 and/or the input device 350 as a component of the communication module 390 and/or the input device 350.

At least some of the components may be connected to each other through a communication method (e.g., a bus, general purpose input and output (GPIO), serial peripheral interface (SPI), or mobile industry processor interface (MIPI)) between peripheral devices, and may exchange signals (e.g., commands or data) with each other.

Figure 4:
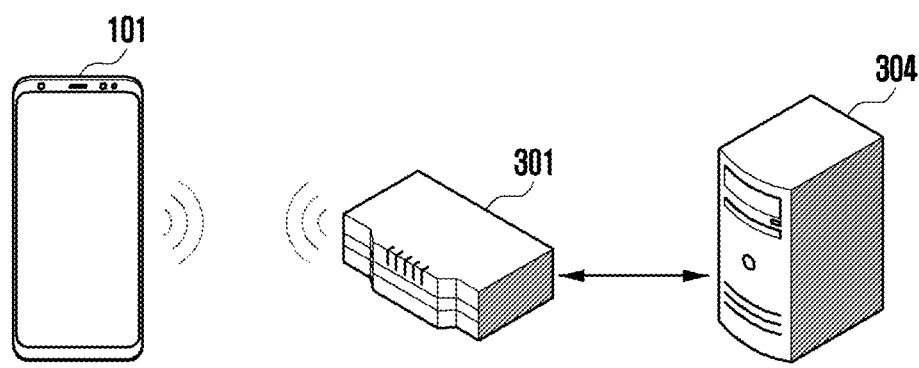
FIG. 4 illustrates a diagram of an example operation for an electronic device to identify a product ID of an external electronic device according to various embodiments of the disclosure.

FIG. 4 illustrates a diagram of an example operation for the electronic device 301 to identify a product ID of an external electronic device (e.g., the electronic device 101) according to various embodiments of the disclosure The electronic device 301 may communicate with an external electronic device (e.g., the electronic device 101) using an NFC module included in the communication module 390. The electronic device 301 may transmit information related to the external electronic device (e.g., the electronic device 101) from the external electronic device (e.g., the electronic device 101) based on NFC communication.

The electronic device 301 may transmit the information related to the external electronic device (e.g., the electronic device 101) to an external electronic device (e.g., the electronic device 304) capable of storing a database as human interface device (HID) information. The external electronic device (e.g., the electronic device 101) may communicate with the electronic device 301 based on NFC communication by driving power. According to various embodiments, the external electronic device (e.g., the electronic device 101) may communicate with the electronic device 301 based on a passive NFC module that does not require power.

Figure 5A:
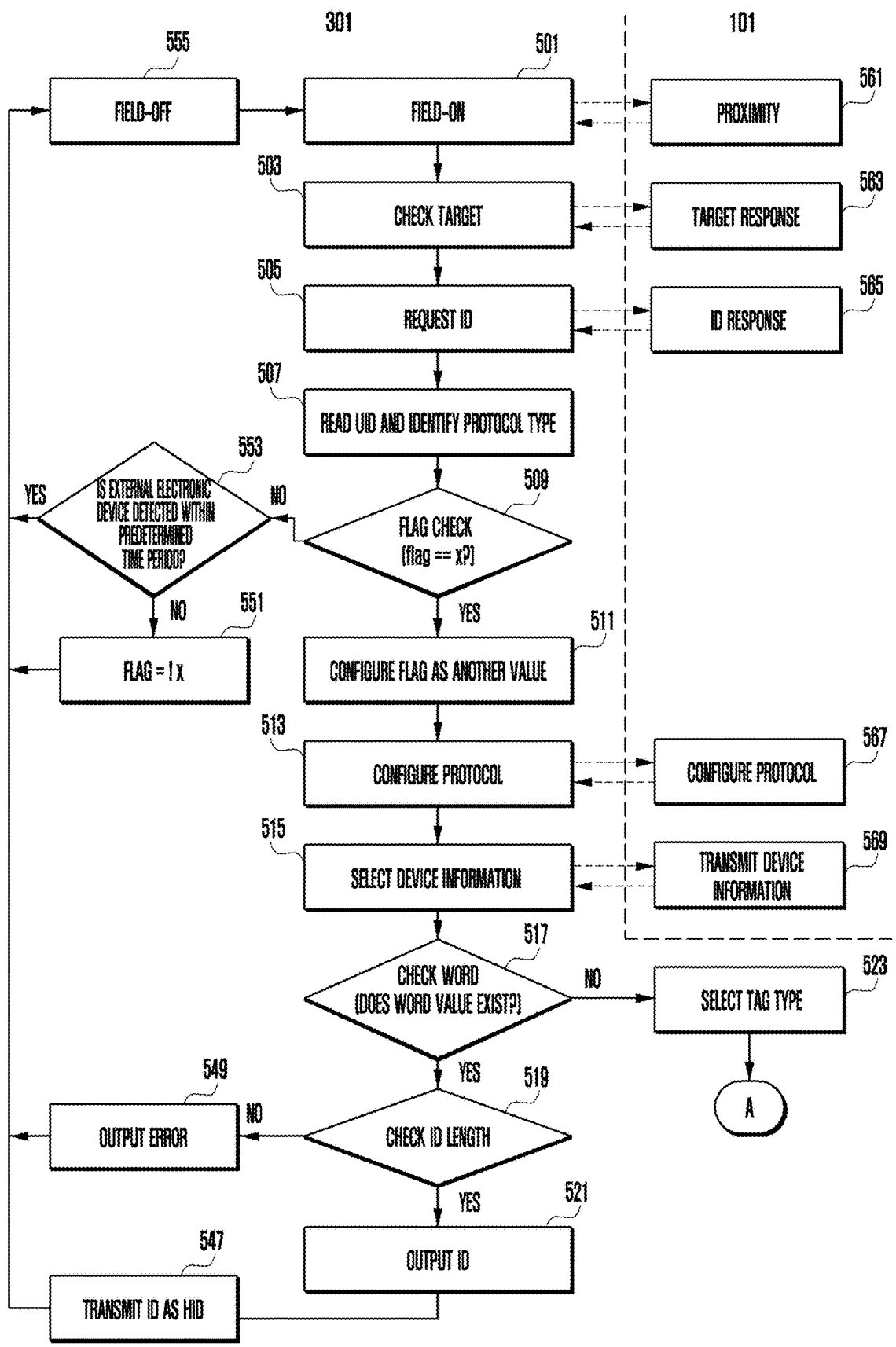
FIG. 5A illustrates a flowchart of an example a method for an electronic device to identify information on an external electronic device based on NFC according to various embodiments of the disclosure.
Figure 5B:
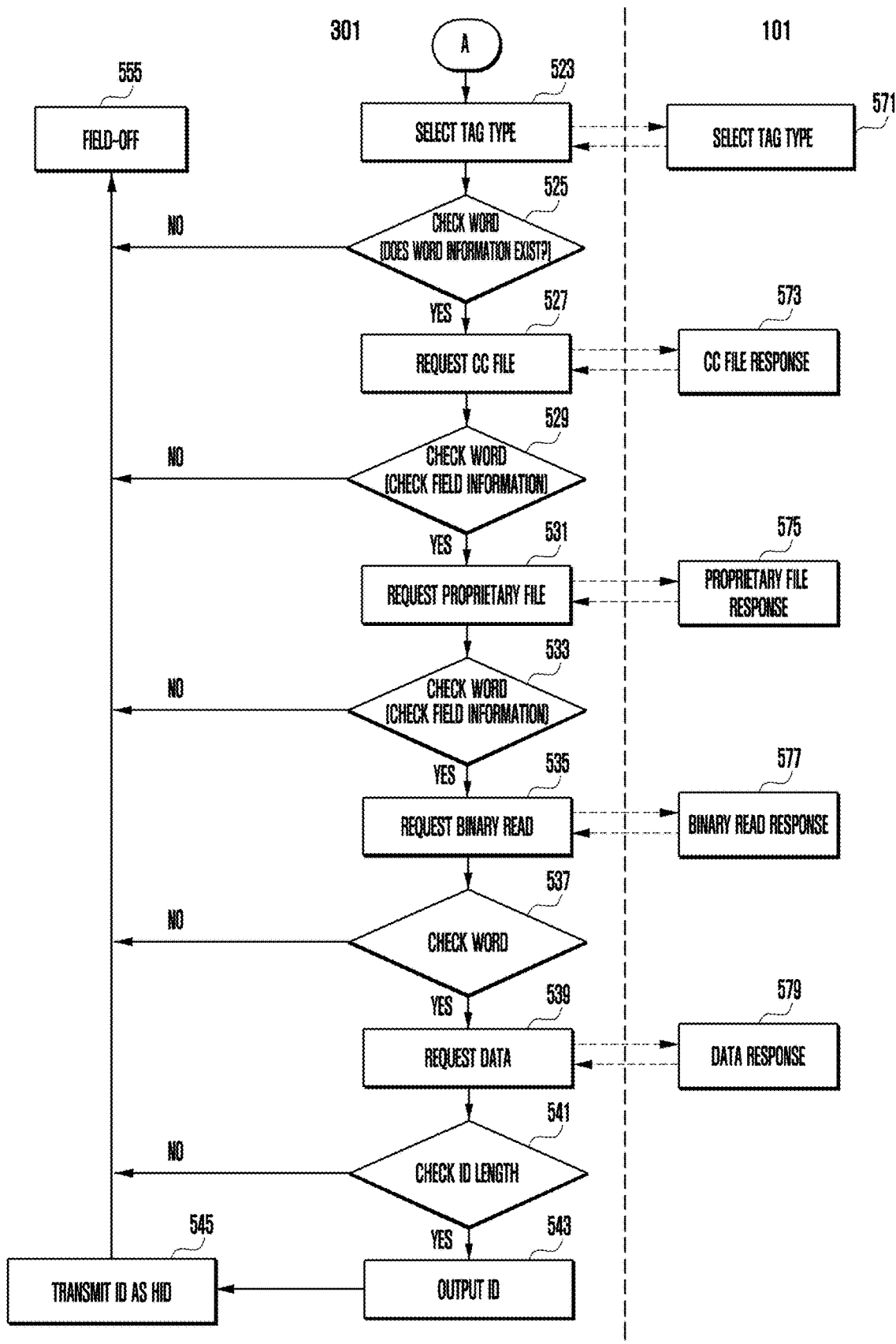
FIG. 5B illustrates a flowchart of an example method for an electronic device to identify information on an external electronic device based on NFC according to various embodiments of the disclosure.

FIG. 5A illustrates a flowchart of an example method for an electronic device to identify information on an external electronic device (e.g., the electronic device 101) based on NFC according to various embodiments of the disclosure, and FIG. 5B illustrates a flowchart of an example method for an electronic device to identify information on an external electronic device (e.g., the electronic device 101) based on NFC according to various embodiments of the disclosure.

In operation 501, the electronic device 301 may perform a field-on operation under the control of the processor 320.

In operation 501, the field-on operation may be an operation for the electronic device 301 to transmit a signal of an NFC band through the communication module 390 (e.g., an NFC module) under the control of the processor 320.

In operation 501, the field-on operation may be an operation for the electronic device 301 to generate a wireless frequency field through the communication module 390 (e.g., the NFC module) under the control of the processor 320. The field-on operation of the electronic device 301 may be an initial operation for performing NFC.

When it is detected that the signal of the NFC band is transmitted from the electronic device 301 under the control of the processor 120, in operation 561, the external electronic device (e.g., the electronic device 101) may transmit a response signal to the electronic device 301 through the communication module 190 (e.g., the NFC module). The response signal may be a signal indicating that the external electronic device (e.g., the electronic device 101) is close to the electronic device 301.

In operation 503, the electronic device 301 may perform a target check operation under the control of the processor 320. The target may be, for example, the external electronic device (e.g., the electronic device 101). The target check operation may be an operation of checking whether short-range communication (e.g., NFC communication) is possible from the external electronic device (e.g., electronic device 101) through the communication module 390 (e.g., the NFC module).

In operation 563, the external electronic device (e.g., the electronic device 101) may transmit a target response signal to the electronic device 301 through the communication module 190 in response to a target check request from the electronic device 301 under the control of the processor 120. The target response signal may be a signal indicating that short-range communication (e.g., NFC communication) is possible through the communication module 390 (e.g., the NFC module).

In operation 505, when receiving the target response signal from the external electronic device (e.g., the electronic device 101) under the control of the processor 320, the electronic device 301 may request an NFC identifier. The NFC identifier may be information that can identify the NFC module.

When exchanging data through communication, the electronic device 301 and the external electronic device (e.g., the electronic device 101) may exchange data using an NFC data exchange format (NDEF). In NFC communication, the NFC ID may include information on the external electronic device (e.g., the electronic device 101) or information on the NFC module.

The NFC ID according to various embodiments of the disclosure is obtained by changing a data field system of the NFC ID through a manufacturer or a standard forum, and may include information on the external electronic device (e.g., the electronic device 101) and may further include flag information for error checking.

In operation 505, the electronic device 301 may request the NFC ID through the communication module 390 (e.g., the NFC communication) under the control of the processor 320.

In operation 565, the external electronic device (e.g., the electronic device 101) may transmit the NFC ID to the electronic device 301 through the communication module 190 (e.g., the NFC module) under the control of the processor 120.

When receiving an ID transmission request of the external electronic (e.g., the electronic device 101) from the electronic device 301, in operation 565, the external electronic device (e.g., the electronic device 101) may transmit the NFC ID to the electronic device 301 through the communication module 190 (e.g., the NFC module) under the control of the processor 120.

In operation 507, the electronic device 301 may read a unique identifier (UID) from the NFC ID under the control of the processor 320 and may identify a communication protocol type. The UID may include a unique number of the NFC module included in the external electronic device (e.g., the electronic device 101) and/or a manufacturer ID code.

In operation 509, the electronic device 301 may identify flag information from the NFC ID under the control of the processor 320.

The flag information according to various embodiments of the disclosure may be flag information for identifying whether the target is misrecognized and/or recognized in a duplicated manner, and may be information created by the manufacturer when the external electronic device (e.g., the electronic device 101) stores the NFC ID information and/or generates the NFC ID information.

In operation 509, the electronic device 301 may identify the flag information from the NFC ID under the control of the processor 320.

For example, in operation 509, the electronic device 301 may determine whether the flag information matches the flag in the NFC ID under the control of the processor 320. When it is determined that the flag matches the flag in the NFC ID, it may be determined that the external electronic device (e.g., the electronic device 101) is initially recognized. When it is determined that the flag does not match the flag in the NFC ID, it may be determined that the external electronic device (e.g., the electronic device 101) is recognized in a duplicated manner. When it is determined that the flag matches the flag in the NFC ID, it may be determined that the external electronic device (e.g., the electronic device 101) is normally recognized. When it is determined that the flat does not match the flag in the NFC ID, it may be determined that the external electronic device (e.g., the electronic device 101) is misrecognized.

In operation 509, when it is determined that the flag information matches the flag in the NFC ID, the electronic device 301 may branch to operation 511 under the control of the processor 320.

In operation 509, when it is determined that the flag information does not match the flag in the NFC ID, the electronic device 301 may branch to operation 553 under the control of the processor 320.

In operation 509, when it is determined that the flag information matches a specific value in the NFC ID, the electronic device 301 may branch to operation 511 under the control of the processor 320.

In operation 509, when it is determined that the flag information does not match the specific value in the NFC ID, the electronic device 301 may branch to operation 553 under the control of the processor 320.

In operation 509, under the control of the processor 320, the electronic device 301 may identify the flag information from the NFC ID, and may branch to operation 511 when it is determined that the NFC ID is initially recognized and/or normally recognized.

In operation 509, under the control of the processor 320, the electronic device 301 may identify the flag information from the NFC ID, and may branch to operation 553 when it is determined that the NFC ID is recognized in a duplicated manner and/or misrecognized.

In operation 553, the electronic device 301 may determine whether the external electronic device (e.g., the electronic device 101) is detected within a predetermined time period under the control of the processor 320.

In operation 553, under the control of the processor 320, the electronic device 301 may determine whether the NFC ID of the external electronic device (e.g., the electronic device 101) is detected within the predetermined time period while performing monitoring.

In operation 553, under the control of the processor 320, the electronic device 301 may branch to operation 551 when it is determined that the external electronic device (e.g., the electronic device 101) is detected exceeding the predetermined time period.

In operation 553, under the control of the processor 320, the electronic device 301 may branch to operation 551 when the NFC ID of the external electronic device (e.g., the electronic device 101) is detected exceeding the predetermined time period.

In operation 553, under the control of the processor 320, the electronic device 301 may branch to operation 555 when the external electronic device (e.g., the electronic device 101) is detected within the predetermined time period.

In operation 553, under the control of the processor 320, the electronic device 301 may branch to operation 555 when the NFC ID of the external electronic device (e.g., the electronic device 101) is detected within the predetermined time period. In various embodiments, the predetermined time period may be around 300 ms.

In operation 551, under the control of the processor 320, the electronic device 301 may configure the flag of the NFC ID of the external electronic device (e.g., the electronic device 101) to a specific value and may branch to operation 555 when the NFC ID of the external electronic device (e.g., the electronic device 101) is detected exceeding the predetermined time period. The configuring the flag of the NFC ID of the external electronic device (e.g., electronic device 101) to the specific value may be an operation of configuring the external electronic device (e.g., electronic device 101) to be recognized for the first time.

In operation 553, under the control of the processor 320, the electronic device 301 may branch to operation 555 when the NFC ID of the external electronic device (e.g., electronic device 101) is detected within the predetermined time period.

In operation 555, the electronic device 301 may perform a field-off operation under the control of the processor 320. The field-off operation may be an operation of stopping transmission of a signal of an NFC band through the communication module 390 (e.g., an NFC module).

When it is determined that the NFC ID is initially recognized and/or normally recognized, in operation 511, the electronic device 301 may configure the flag of the NFC ID to a value other than the specific value under the control of the processor 320. The configuring the flag of the NFC ID to the value other than the specific value may be an operation of configuring the external electronic device (e.g., electronic device 101) to have been recognized.

In operation 513, the electronic device 301 may configure a communication protocol under the control of the processor 320. In operation 513, the electronic device 301 may configure the communication protocol of the NFC module under the control of the processor 320.

In operation 513, under the control of the processor 320, the electronic device 301 may request the communication protocol from the external electronic device (e.g., the electronic device 101) through the communication module (e.g., the NFC module), and may receive a response in response to the communication protocol configuration request from the external electronic device (e.g., the electronic device 101).

In operation 567, under the control of the processor 120, the external electronic device (e.g., the electronic device 101) may transmit the response to the communication protocol configuration request to the electronic device 301 through the communication module (e.g., the NFC module)

In operation 515, under the control of the processor 320, the electronic device 301 may request device information from the external electronic device (e.g., the electronic device 101) to select the device information through the communication module (e.g., the NFC module), and may receive the device information from the from the external electronic device (e.g., the electronic device 101). The device information may be information on the electronic device 101, for example, and may be information included in the NFC ID.

In operation 569, under the control of the processor 120, the external electronic device (e.g., the electronic device 101) may transmit the device information to the electronic device 301 through the communication module (e.g., the NFC module)

In operation 517, under the control of the processor 320, the electronic device 301 may perform a word check operation related to the device information included in the NFC ID. The word check operation may be an operation of checking the device information included in the NFC ID.

In operation 517, under the control of the processor 320, the electronic device 301 may perform the word check operation in the NFC ID. In operation 517, the electronic device 301 may determine whether there is a word value for the device information in the NFC ID, under the control of the processor 320.

In operation 517, under the control of the processor 320, the electronic device 301 may branch to operation 519 when it is determined that there is the word value in the NFC ID.

In operation 517, under the control of the processor 320, the electronic device 301 may branch to operation 523 when it is determined that there is no word value in the NFC ID.

In operation 519, under the control of the processor 320, the electronic device 301 may identify information on an ID length in the NFC ID. The ID length is data that can identify the length of the NFC ID and may be data that can identify an error check.

In operation 519, under the control of the processor 320, the electronic device 301 may branch to operation 521 when it is determined that there is the information on the ID length in the NFC ID.

In operation 519, under the control of the processor 320, the electronic device 301 may branch to operation 549 when it is determined that there is no information on the ID length in the NFC ID.

When it is determined that the information on the ID length in the NFC ID is incorrect, in operation 549, the electronic device 301 may perform an error output operation under the control of the processor 320.

In operation 549, under the control of the processor 320, the operation of outputting the error may be an operation for the electronic device 301 to output a warning sound (e.g., a beep sound) through the sound output device 355 and/or to output information on the error through the display device 360. The operation of outputting information on the error through the display device 360 may be an operation of outputting light of a specific color through an LED.

In operation 549, under the control of the processor 320, the operation of outputting the error may be an operation for the electronic device 301 to output an auditory signal for the error through the sound output device 355, and/or to output a visual signal for the error through the display device 360. The operation of outputting the error through the display device 360 may be an operation of outputting light of a specific color through an LED.

When it is determined that there is the information on the ID length in the NFC ID, in operation 521, the electronic device 301 may output the NFC ID under the control of the processor 320. In various embodiments, it is determined that the information on the ID length in the NFC ID is correct, in operation 521, the electronic device 301 may output the NFC ID under the control of the processor 320. The operation of outputting the NFC ID may be an operation of outputting a warning sound (e.g., a beep sound) through the sound output device 355 and/or an operation of outputting information on a path through the display device 360. The operation of outputting the information on the path through the display device 360 may be an operation of outputting light of a specific color through an LED.

When the ID is read by the NFC module, in operation 547, the electronic device 301 may transmit the NFC ID to the external electronic device (e.g., the electronic device 304) as a human interface device (HID) under the control of the processor 320, and may branch to operation 555.

When it is determined that there is no word value in the ID transmitted to the NFC module, in operation 523, under the control of the processor 320, the electronic device 301 may request information for selecting an NFC tag type from the external electronic device (e.g., the electronic device 101) and may receive the information on the tag type from the external electronic device (e.g., the electronic device 101).

When the information on the tag type is received, in operation 525, the electronic device 301 may check word information included in the tag type under the control of the processor 320.

In operation 525, under the control of the processor 320, the electronic device 301 may determine whether there is the word information included in the tag type and/or whether there is an error, and may branch to operation 527.

In operation 525, under the control of the processor 320, the electronic device 301 may branch to operation 555 when it is determined there is no word information included in the tag type or that there is the error.

When it is determined that the word information exists or is correct, in operation 527, under the control of the processor 320, the electronic device 301 may request a CC file from the external electronic device (e.g., the electronic device 101) and may receive the CC file from the external electronic device (e.g., the electronic device 101).

The CC file is a capability container file and may include data related to data management as data included in an NFC tag platform.

In operation 573, the external electronic device (e.g., the electronic device 101) may transmit the CC file to the electronic device 301 under the control of the processor 120.

When receiving the CC file, in operation 529, the electronic device 301 may check field information included in the CC file under the control of the processor 320.

In operation 529, under the control of the processor 320, the electronic device 301 may branch to operation 555 when the field information is not included in the CC file and/or is determined to be incorrect.

In operation 529, under the control of the processor 320, the electronic device 301 may branch to operation 531 when the field information is included in the CC file and/or is determined to be correct.

In operation 531, under the control of the processor 320, the electronic device 301 may request a proprietary file of the external electronic device (e.g., the electronic device 101) when it is determined that the field information is included in the CC file or the field information is correct, and may receive the proprietary file from the external electronic device (e.g., the electronic device 101).

When the proprietary file is received, in operation 533, the electronic device 301 may check the field information included in the proprietary file under the control of the processor 320.

In operation 533, under the control of the processor 320, the electronic device 301 may branch to operation 535 when it is determined that the field information is included in the proprietary file and/or the field information is correct.

In operation 533, under the control of the processor 320, the electronic device 301 may branch to operation 555 when it is determined that the field information is not included in the proprietary file and/or the field information is incorrect.

In operation 535, under the control of the processor 320, the electronic device 301 may request binary information from the external electronic device (e.g., the electronic device 101) to read the binary information, and may receive the binary information from the external electronic device (e.g., the electronic device 101).

When the binary information is received from the external electronic device (e.g., the electronic device 101), in operation 537, the electronic device 301 may check the word information included in the binary information under the control of the processor 320.

In operation 537, under the control of the processor 320, the electronic device 301 may branch to operation 555 when it is determined that the word information is not included in the binary information and/or the word information is an error.

In operation 537, under the control of the processor 320, the electronic device 301 may branch to operation 555 when it is determined that an answer does not include a response value as a target included in the binary information and/or the answer is an error.

In operation 537, under the control of the processor 320, the electronic device 301 may branch to operation 539 when it is determined that the answer includes the response value as the target included in the binary information and/or the answer is correct.

In operation 539, under the control of the processor 320, the electronic device 301 may request data through the communication module 390 (e.g., the NFC module) and may receive the data from the external electronic device (e.g., the electronic device 101). The data may be information on the external electronic device (e.g., the electronic device 101).

In operation 579, under the control of the processor 120, the external electronic device (e.g., the electronic device 101) may transmit data information to the electronic device 301 in response to the data request from the electronic device 301.

When receiving the data from the external electronic device (e.g., the electronic device 101), in operation 541, the electronic device 301 may identify the information on the ID length in the NFC ID under the control of the processor 320. The ID length is data that can identify the length of the NFC ID, and may be information that can identify error check.

In operation 541, under the control of the processor 320, the electronic device 301 may branch to operation 543 when it is determined that there is the information on the ID length in the NFC ID.

In operation 541, under the control of the processor 320, the electronic device 301 may branch to operation 555 when it is determined that there is no information on the ID length in the NFC ID.

When it is determined that there is the information on the ID length in the data, in operation 543, the electronic device 301 may output the NFC ID under the control of the processor 320. The operation of outputting the NFC ID may be an operation of outputting a warning sound (e.g., beep sound) through the sound output device 355 and/or outputting the information on the path through the display device 360. The operation of outputting the information on the path through the display device 360 may be an operation of outputting light of a specific color through an LED.

The operation of outputting the NFC ID may be an operation of outputting an auditory signal for the path through the sound output device 355 and/or outputting the information on the path through the display device 360. This may be an operation of outputting the information on the path as a visual signal through the display device 360.

When the NFC ID is output, in operation 545, the electronic device 301 may transmit the NFC ID to the external electronic device (e.g., the electronic device 304) as HID under the control of the processor 320, and may branch to operation 555.

Figure 6:
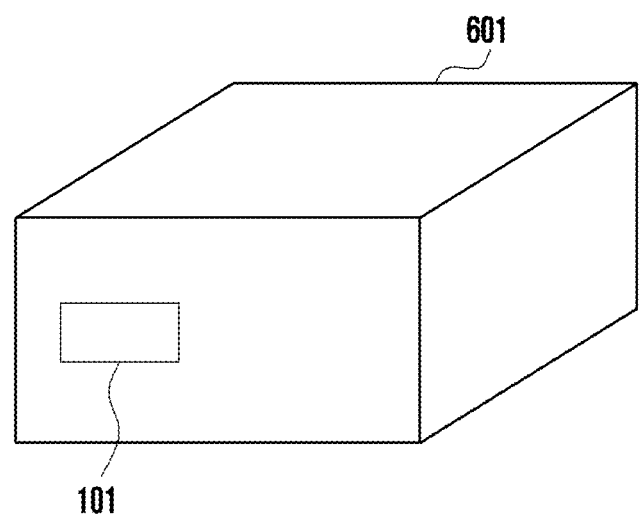
FIG. 6 illustrates a diagram an example external electronic device according to various embodiments of the disclosure.

FIG. 6 illustrates a diagram of an example external electronic device 101 according to various embodiments of the disclosure.

The external electronic device 101 mentioned in FIG. 6 may be similar to the external electronic device 101 mentioned in FIG. 4. However, the external electronic device 101 mentioned in FIG. 6 may include a passive NFC module that does not include a separate power source, and thus may be attached to a packaging 601 of a product.

The electronic device 301 may communicate with the external electronic device (e.g., the electronic device 101) using the NFC module included in the communication module 390. The electronic device 301 may transmit information related to the external electronic device (e.g., the electronic device 101) to the external electronic device (e.g., the electronic device 101) based on NFC communication.

The electronic device 301 may transmit the information related to the external electronic device (e.g., the electronic device 101) to the external electronic device (e.g., electronic device 304) capable of storing a database as HID information.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, and/or alternatives for a corresponding embodiment. With regard to the description of the drawings, similar reference numerals may be used to designate similar or relevant elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for identifying information on an external electronic device based on near field communication (NFC), the method comprising:
    transmitting a signal of an NFC band to the external electronic device;
    identifying whether the external electronic device is capable of NFC;
    in response to identifying that the external electronic device is capable of NFC, requesting an NFC identifier (ID) from the external electronic device;
    receiving, from the external electronic device, the NFC ID;
    identifying a communication protocol type based on reading a unique ID from the NFC ID;
    identifying flag information included in the NFC ID; and
    determining whether the external electronic device is initially recognized or normally recognized through the flag information.

2. The method of claim 1, further comprising:
    in response to determining that the external electronic device is recognized in a duplicated manner or misrecognized determining whether the NFC ID is detected within a predetermined time period.

3. The method of claim 2, further comprising:
    stopping transmission of the signal of the NFC band to the external electronic device in response to detecting the NFC ID within a predetermined time period in a case in which it is determined that the external electronic device is recognized in a duplicated manner or misrecognized; and
    configuring the NFC ID to be initially recognized or normally recognized and stopping transmission of the signal of the NFC band to the external electronic device in response to detecting that the NFC ID is exceeding the predetermined time period in a case in which it is determined that the external electronic device is recognized in a duplicated manner or misrecognized.

4. The method of claim 1, further comprising:
    in response to determining that the external electronic device is initially recognized or normally recognized through the flag information,
        requesting a communication protocol configuration from the external electronic device, and
        receiving the communication protocol configuration from the external electronic device;
    requesting information for device selection from the external electronic device;
    receiving device information from the external electronic device;
    determining whether there is a word value for the device information received from the external electronic device;
    in response to determining that there is a word value for the device information received from the external electronic device, identifying an ID length of the NFC ID, to check for an error; and
    in response to determining there is no error based on identifying the ID length, outputting the NFC ID.

5. The method of claim 4, further comprising:
    in response to determining the error based on identifying the ID length, outputting the error.

6. The method of claim 5, wherein the outputting the NFC ID further comprises outputting at least one of an auditory signal and a visual signal.

7. The method of claim 4, further comprising:
    transmitting the NFC ID, as human interface device (HID) information, to a second external electronic device, wherein the second electronic device is configured to manage a database.

8. The method of claim 4, further comprising:
    receiving at least one piece of information among a tag type, a CC file, a proprietary file, or binary information from the external electronic device to check word information in response to no word information of the device information being received from the external electronic device;
    requesting data from the external electronic device and receiving the data from the external electronic device in response to the word information existing in the at least one piece of information among the tag type, the CC file, the proprietary file, or the binary information; and
    stopping transmission of the signal of the NFC band to the external electronic device in response to determining that the word information does not exist in the at least one piece of information.

9. The method of claim 8, further comprising:
    identifying the ID length of the NFC ID and information to check an error in response to receiving the data from the external electronic device;
    outputting the NFC ID in response to determining that there is no error by identifying the ID length;
    outputting the error in response to determining that there is the error by identifying the ID length; and
    transmitting the NFC ID, as human interface device (HID) information, to a second external electronic device, wherein the second electronic device is configured to manage a database.

10. The method of claim 9, wherein the outputting the NFC ID further comprises outputting at least one of an auditory signal and a visual signal.

11. An electronic device comprising:
    a communication module configured to include an NFC module;
    a memory; and
    a processor operatively coupled to the memory, wherein the processor is configured to:
    transmit a signal of an NFC band to an external electronic device through the NFC module;
    identify whether the external electronic device is capable of NFC;
    request an NFC identifier (ID) from the external electronic device through the NFC module;
    receive the NFC ID from the external electronic device;

read a unique ID from the NFC ID to identify a communication protocol type;
identify flag information included in the NFC ID; and
determine whether the external electronic device is initially recognized or normally recognized through the flag information.

12. The electronic device of claim 11, wherein the processor is further configured to determine whether the NFC ID is detected within a predetermined time period in response to determining that the external electronic device is recognized in a duplicated manner or misrecognized.

13. The electronic device of claim 12, wherein the processor is further configured to:
stop transmission of the signal of the NFC band to the external electronic device in response to the NFC ID being detected within a predetermined time period in a case in which it is determined that the external electronic device is recognized in a duplicated manner or misrecognized; and
configure the NFC ID to be initially recognized or normally recognized and stops transmission of the signal of the NFC band to the external electronic device in response to detecting that the NFC ID is exceeding the predetermined time period in a case in which it is determined that the external electronic device is recognized in a duplicated manner or misrecognized.

14. The electronic device of claim 11, wherein the processor is further configured to:
in response to determining that the external electronic device is initially recognized or normally recognized through the flag information,
request a communication protocol configuration from the external electronic device, and
receive the communication protocol configuration from the external electronic device;
request information for device selection from the external electronic device;
receive device information from the external electronic device through the NFC module;
determine whether there is a word value for the device information received from the external electronic device;
in response to determining that there is a word value for the device information received from the external electronic device, identify an ID length of the NFC ID to check for an error; and
in response to determining there is no error based on identifying the ID length, control the NFC ID to output.

15. The electronic device of claim 14, wherein the processor is further configured to:
in response to determining the error based on identifying the ID length, control the error to output.

16. The electronic device of claim 14, wherein the processor is further configured to control the NFC ID to output as at least one of an auditory signal and a visual signal.

17. The electronic device of claim 14, wherein the processor is further configured to:
control the NFC ID to be transmitted, by a human interface device (HID) connection, to a second external electronic device, wherein the second electronic device is configured to manage a database.

18. The electronic device of claim 14, wherein the processor is further configured to:
receive at least one piece of information among a tag type, a CC file, a proprietary file, or binary information from the external electronic device through the NFC module to check word information in response to there being no word information of the device information received from the external electronic device;
request data from the external electronic device in response to the word information existing in the at least one piece of information among the tag type, the CC file, the proprietary file, or the binary information; and
stop transmission of the signal of the NFC band to the external electronic device through the NFC module in response to determining that the word information does not exist in the at least one piece of information among the tag type, the CC file, the proprietary file, or the binary information.

19. The electronic device of claim 18, wherein the processor is further configured to:
identify the ID length of the NFC ID and information to check an error in response to receiving the data from the external electronic device;
output the NFC ID in response to determining that that there is no error by identifying the ID length;
output the error in response to determining that there is the error by identifying the ID length; and
transmit the NFC ID, as human interface device (HID) information to a second external electronic device, wherein the second electronic device is configured to manage a database.

20. The electronic device of claim 19, wherein the processor is further configured to control the NFC ID to output at least one of an auditory signal and a visual signal.

* * * * *